Oct. 13, 1964     EDOUARD-LOUIS TISSOT     3,152,439

LEVER PALLET FOR TIMEPIECES

Filed Nov. 5, 1962

Inventor
Edouard-Louis Tissot
By Stevens, Davis, Miller & Mosher
Attorneys

United States Patent Office 3,152,439
Patented Oct. 13, 1964

3,152,439
LEVER PALLET FOR TIMEPIECES
Edouard-Louis Tissot, Le Locle, Neuchatel, Switzerland, assignor to Fabrique d'Horlogerie Chs. Tissot & Fils S.A., Le Locle, Neuchatel, Switzerland, a company limited by shares
Filed Nov. 5, 1962, Ser. No. 235,235
Claims priority, application Switzerland Jan. 25, 1962
6 Claims. (Cl. 58—121)

This invention relates to lever pallets for timepieces and, in particular, to lever pallets comprising a rigid body member constituting a reinforcing armature and a plastic lining having a small coefficient of friction.

Lever pallets of this type are already known in the art. The Swiss Patent No. 334,708, for instance, discloses a pallet, the armature of which consists of a metal piece and the lining of which consists of a cap covering the front end of said armature. The working faces of this pallet, i.e. the impulse face and the locking face are situated on the lining, while the armature has only the function of reinforcing this lining by preventing the same from any deformation.

Lever pallets of this type have the great advantage that they can work without lubrication. The lining can, indeed, be made of a plastic, such as, for instance, a polyamid having a coefficient of friction in dry state which is even smaller than that of the synthetic jewels commonly used in the manufacture of lever pallets.

The composite lever pallets such as that disclosed in the patent above-mentioned had, however, till now, some drawbacks. In order to support the lining in a sufficiently rigid manner by means of the armature, i.e. in order to prevent the escape wheel teeth from driving into the working faces of the cap, the latter had to be made relatively thin. Experience, however, has shown that, if one tries to reduce the cap thickness, certain difficulties arise. When an escape wheel tooth drops onto the locking face of these pallets and, immediately after unlocking, impacts occur on the pallet. Whereas the first impact occurs on the locking face, the second is produced on the impulse face, when the tooth comes into contact therewith after it has passed over the edge between the locking face and the impulse face. These impacts, now, impair the lining in the vicinity of the points of impact.

It is, therefore, an object of this invention to obviate this drawback while keeping the advantages of the pallets of the type mentioned above, i.e. while keeping the possibility of letting these pallets work without lubrication.

With the pallet improved in accordance with this invention, two plane surface portions of the pallet separated from each other by an edge, one of the said surface portions constituting the locking face of the pallet and the other surface portion constituting a part of the impulse face thereof, are situated on the armature of the pallet while the remaining part of the impulse face is located on the lining of said pallet.

More specific objects of the invention will still become apparent to those skilled in the art in the course of the following description.

One embodiment of the pallet improved in accordance with this invention is represented diagrammatically and by way of example in the accompanying drawings.

Figure 1:
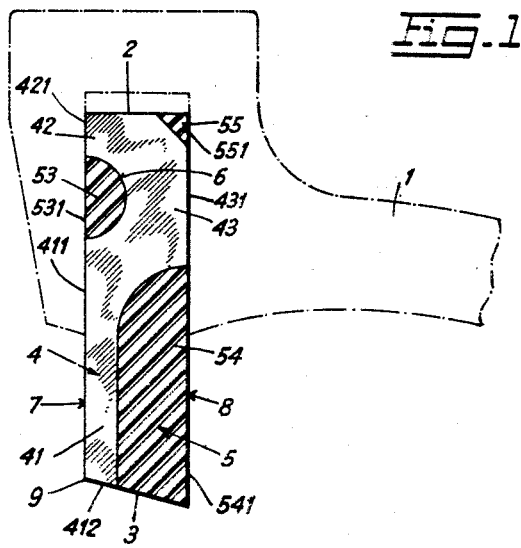
FIG. 1 is a median section along a horizontal plane of this embodiment.
Figure 2:
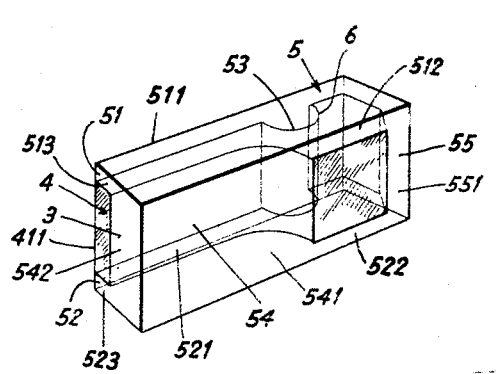
FIG. 2 is a transparent perspective view thereof.

The pallet represented in the drawings is secured in the usual manner at the end of a lever arm 1 represented in dot-and-dash lines. The pallet shown in FIG. 1 is an entering left-hand pallet. It lies in a lever slot and is glued thereto by means of shellac. As a whole, the pallet shown has the same shape as a usual pallet, i.e. the shape of a truncated rectangular prism, the base 2 of which is perpendicular to the pallet axis and the truncated face 3 of which constitutes the impulse face of the pallet. Instead of being made in one piece, this pallet is composed of two pieces fixed to one another: an armature or a reinforcing piece 4 made of synthetic jewel and a lining 5 made of a plastic having a small coefficient of friction and surrounding armature 4. To make the lining, a plastic such as a polyamid is preferably chosen so that it can directly be cast on the armature 4. The two pieces 4 and 5 of the pallet are rigidly connected to each other by virtue of their particular shape. Thus, the lining 5 comprises two elongated portions 51 and 52 constituting parallel walls and three stays 53, 54 and 55 which interconnect walls 51 and 52. Stay 53 has a semi-cylindrical shape and it interconnects parts of walls 51 and 52 extending between the ends of these walls, whereas stay 54 extends over a large part of the length of these walls from their front ends towards stay 53. Stay 55 has a triangular cross-section and stands at the other end of walls 51 and 52. It will be observed that stays 53, 54 and 55 alternately stand in the vicinity of both edges of walls 51 and 52, i.e. on either side of armature 4.

Armature 4 is embedded in lining 5. It comprises a front portion 41, having a rectangular cross-section. This front portion 41 is in contact with stay 54 and it extends between walls 51 and 52. The side face 411 of portion 41 is flush with the side faces 511 and 521 of walls 51 and 52. Armature 4, further, comprises a rear portion 42 which also extends between walls 51 and 52, but at the other end thereof. The rear portion 42 is in contact with the triangular stay 55. It finally comprises a middle portion 43 extending from one side of the pallet to the other side thereof. A semi-cylindrical groove 6, having exactly the same shape as stay 53, is provided in the middle portion 43 to receive stay 53.

The pallet described above comprises a first plane side surface 7 which is composed of the surface portions 421, 411, 511, 521 and 531, which are flush with each other, and a second side surface 8 which is also plane and parallel to the first one, said second side surface being composed of portions 551, 431, 541, 512 and 522, which are also flush with each other.

The pallet is gripped by lever arm 1 along the surface portions 411, 421 and 431 of armature 4, so that the pallet is rigidly held in place. Moreover, lining 5 is rigidly fixed on to armature 4 by virtue of its particular shape. It will be observed, for instance, that stay 54 and walls 51 and 52 constitute a stiff, U-shaped structure which surrounds the armature portion 41 on three sides so that the front face 412 of portion 41 and the front faces 513, 523 and 542 of the lining portions 51, 52 and 54 will be flush with each other and not leave any gap therebetween, these portions together constituting the impulse face 3 of the pallet.

The pallet (4, 5) works in the same manner as a usual pallet. Each escape wheel tooth which cooperates with this pallet comes in abutting engagement with the surface portion 411 of pallet (4, 5) in the vicinity of the fore-end of portion 41 when said escape wheel tooth drops on the pallet. The impact produced at that moment occurs on the armature made of synthetic jewel, which has a sufficient resistance and stiffness to resist said impact. The latter will, thus, neither deform nor impair the pallet.

During unlocking, the escape wheel tooth first slides along a part of surface portion 411 of the pallet and then jumps from the edge 9 separating the locking face from the impulse face of the pallet on to the latter face along which it travels through a path perpendicular to edge 9.

Portion 41 is made wide enough in order that this second impact also occurs on armature 4. Immediately after this second impact, the escape wheel tooth, however, travels along its working path on the impulse face 3, thereby pushing the pallet aside and causing the lever to rock. Since the resistance offered by the lever during its rocking motion is relatively important, the force exerted by the escape wheel tooth on the impulse face 3 is also relatively strong. Since the escape wheel tooth slides on the surface portion 542 of the lining portion 54 and, since the coefficient of friction of the material constituting lining 5 is extremely small, even in dry state, the pallet can, nevertheless, work perfectly without lubrication. Moreover, the lining portion 54 on which the escape wheel tooth slides during the impulse is reinforced by the walls 51 and 52 and constitutes, together with these walls, a massive, rigid structure which cannot be deformed and which is pressed hard against armature portion 41 under the action of stay 53. Even in the absence of any adherence between the surface portions of lining 5 and of armature 4, which are in contact with each other, this structure runs no risk of becoming distorted or impaired.

To manufacture the pallet described above, a jewel is first given the shape of armature 4 and it is then inserted into a mould having a cavity with the same overall sizes as the pallet. The plastic material is then led into the mould in liquid state and under pressure so that it flows round armature 4 and forms the walls 51 and 52 as well as the stays 53, 54 and 55. The plastic injection can be performed by means of a single nozzle, opening, for instance, in one of the walls 51 or 52. By using a polyamid in the manufacture of lining 5, the shrinkage of this material during cooling increases, as a consequence, the force with which the lining 5 is pressed against armature 4. By shrinking, the stays 53, 54 and 55, indeed, press the walls 51 and 52 on to the upper and lower surfaces of armature 4 and the portions of walls 51 and 52, extending between the stays 53, 54 and 55, tend to urge the latter nearer to each other. Stay 54, in particular, is thus urged into the angle formed between the armature portions 41 and 42, so that it is strongly pressed against portion 41 and does not run the risk of being removed therefrom by the escape wheel teeth during an impulse.

Although one embodiment of the invention has been described in detail with reference to the accompanying drawings, it will be understood that various changes in the shape, sizes and arrangement of parts could obviously be resorted to within the scope of the appended claims.

I claim:
1. A lever pallet for timepieces, comprising a rigid body member constituting a reinforcing armature and a lining made of a plastic having a small coefficient of friction, characterized in that two plane surface portions of the pallet, separated from each other by an edge and one of which forms the locking face and the other one constitutes a part of the impulse face, are situated on the armature, while the other part of the impulse face is situated on the lining.

2. A lever pallet, according to claim 1, characterized in that the armature is made in one piece of synthetic jewel.

3. A lever pallet according to claim 2, characterized in that the lining is made in one piece of plastic cast on said armature.

4. A lever pallet according to claim 3, in which the impulse face comprises a plane surface constituting the travelling path of the escape wheel teeth cooperating with said pallet, characterized in that the lining comprises two parallel walls extending on both sides of said travelling path over the whole width of the pallet, and stays interconnecting said walls and alternately standing along the latter, said armature extending between said walls and said stays and being provided with at least one groove adapted for receiving one of said stays, thus ensuring that the armature and the lining be definitely fixed to one another.

5. A lever pallet according to claim 4, characterized in that the lining comprises three stays, two of which stand on one side of said armature and the third of which is located between the two first ones and stands on the other side of said armature, and in that one of the two first stays interconnects the wall ends situated on the side of the impulse face and comprises a front face constituting the part of the impulse face situated on the lining.

6. A lever pallet according to claim 4, characterized in that the armature portions which are flush with the side surfaces of the pallet comprise plane surface portions on either side of the pallet which are parallel to each other and arranged so as to be gripped by the opposed faces of a lever slot, thus ensuring the pallet fixation to the lever.

References Cited in the file of this patent
FOREIGN PATENTS
334,708    Switzerland _____ Jan. 31, 1959